United States Patent [19]

Schmidt

[11] 4,190,297

[45] Feb. 26, 1980

[54] WHEEL FOR AIR OR GAS FILLED TIRES FOR MOTOR VEHICLES

[75] Inventor: Walter Schmidt, Eigeltingen, Fed. Rep. of Germany

[73] Assignee: Swiss Aluminium Ltd., Chippis, Switzerland

[21] Appl. No.: 945,224

[22] Filed: Sep. 25, 1978

[30] Foreign Application Priority Data

Oct. 7, 1977 [DE] Fed. Rep. of Germany ....... 2745163

[51] Int. Cl.$^2$ .......................... B60B 3/04; B60B 23/00
[52] U.S. Cl. ...................................... 301/63 R; 301/97
[58] Field of Search ...................................... 301/96–97, 301/63 R, 65; 29/159.01, 159.1

[56] References Cited

U.S. PATENT DOCUMENTS

| 1,497,295 | 6/1924 | Hyde | 301/96 |
|---|---|---|---|
| 2,822,218 | 2/1958 | Whitfield | 301/65 X |
| 2,992,045 | 7/1961 | Martenet | 301/97 |
| 3,361,484 | 1/1968 | Frank | 301/65 |
| 3,758,161 | 9/1973 | Bradley et al. | 301/63 R |
| 3,874,054 | 4/1975 | Reppert | 301/63 R X |

FOREIGN PATENT DOCUMENTS

| 786739 | 9/1935 | France | 301/97 |
|---|---|---|---|
| 217913 | 3/1942 | Switzerland | 301/97 |
| 939195 | 10/1963 | United Kingdom | 301/97 |

*Primary Examiner*—Charles A. Marmor
*Attorney, Agent, or Firm*—Bachman and LaPointe

[57] ABSTRACT

A wheel for pneumatic tires for use on motor vehicles having a ring-shaped rim around a central disc or dish wherein the rim is made of a composite section with a light metal body section and an insert of higher strength metal which forms part of the surface of the body section.

9 Claims, 4 Drawing Figures

WHEEL FOR AIR OR GAS FILLED TIRES FOR MOTOR VEHICLES

BACKGROUND OF THE INVENTION

The invention concerns a wheel for air or gas filled tires for motor vehicles, the central dish or disc of the wheel being enclosed in a ring-shaped rim.

Because wheels, axles and associated fittings constitute unsprung masses on vehicles, it is important for driving comfort and safety to keep the weight of these components as small as possible. Attempts to employ lightweight wheels has led to lightweight constructions, such as wheels with spokes, and also to the choice of lighter materials, resulting in cast or forged wheels made of alloys of aluminum or magnesium.

However, the cost of spoked wheels is too high. Also, it has been necessary in the case of light metal wheels to make the product more expensive than desired. This is due to the fact that in the case of light metal wheels the lower strength in comparison with steel, for example, and the greater susceptibility to crack formation in highly stressed parts of the light metal wheel, make it necessary to have thick sections there, thus making the product more expensive than desired and at the same time greatly diminishing the weight advantage gained using the light metal. The greater susceptibility to crack formation is particularly evident at the points of transition between the rim and the central disc, and also in the region of the adjacent flanges.

SUMMARY OF THE INVENTION

With this in mind the inventor set himself the task of developing a lightweight wheel of the type discussed hereinabove, which is extremely attractive in price to manufacture, exhibits a long service life and offers a high degree of safety.

This object is solved by way of the present invention in that at least the rim of the wheel is shaped out of a composite section which comprises essentially a lightweight section as body and an insert of higher strength metal which forms part of the surface of the section. The body section and the insert of the composite section are metallurgically bonded.

It has been found to be particularly favorable to make the rim out of an extruded composite section, the body of which is preferably made of an alloy of aluminum or magnesium. This meets the requirement of keeping the unsprung mass as light as possible.

BRIEF DESCRIPTION OF THE DRAWINGS

Further advantages, features and details of the present invention are revealed in the following description of preferred embodiments and with the help of the drawings wherein.

DETAILED DESCRIPTION OF THE PREFERRED EMBODIMENTS

Figure 1:
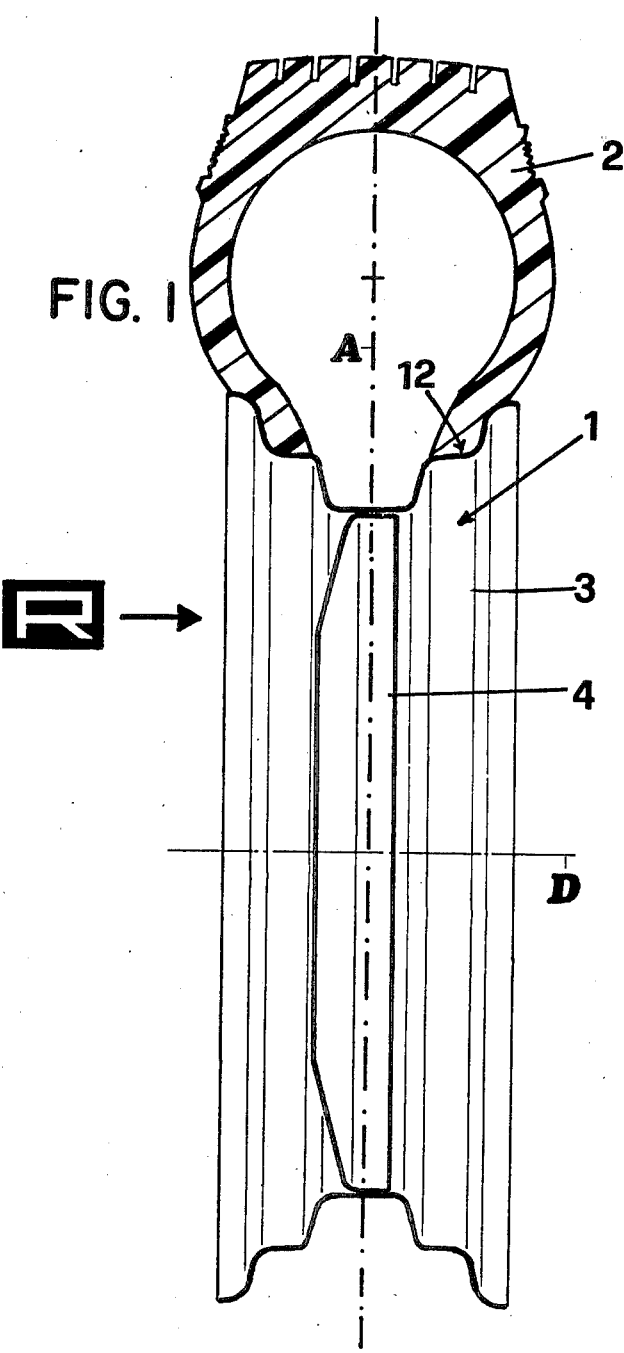
FIG. 1 is a schematic drawing showing a section through a part of a wheel for motor vehicles.

FIG. 1 shows a wheel R with an inflated tire 2 on the wheel rim 1 and, inside the ring-shaped rim 1 which provides a bed 3 for the pneumatic tire 2, a wheel disc or dish 4 situated in the plane A of the wheel R. The axis of rotation of the wheel R is indicated by D.

Figure 2:
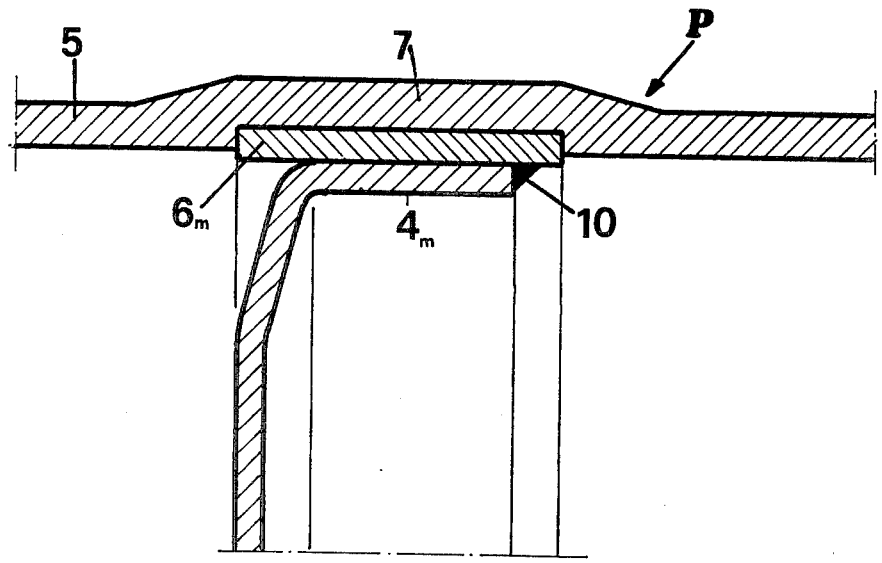
FIG. 2 is an enlarged detail from FIG. 1.
Figure 3:
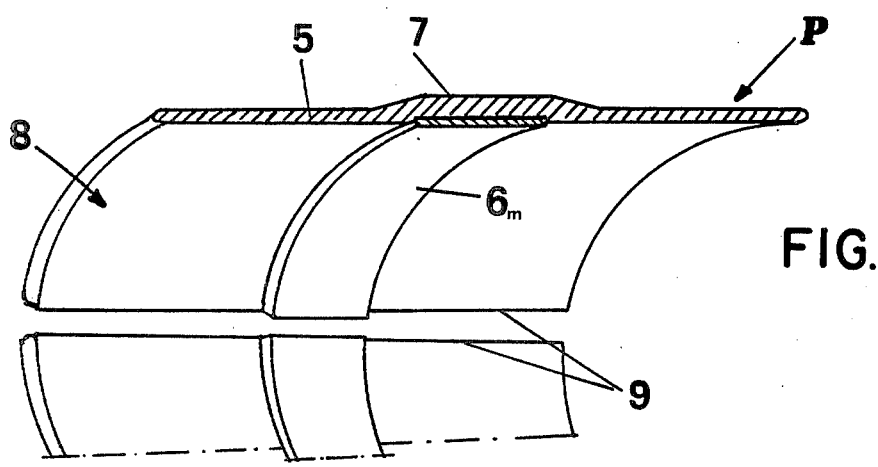
FIG. 3 is a perspective view of a composite section which is part of the wheel in FIG. 1.

The wheel rim 1, as can be seen in particular in FIGS. 2 and 3, is made out of a strip-shaped, extruded composite section P, which is made up of an essentially rectangular light metal body section 5, as viewed in cross section, and a steel strip insert 6 which has been metallurgically joined to the body 5 as during extrusion. The bed 3 of the rim is strengthened in the region of the steel strip 6 by a projection 7 in the light metal body 5.

The composite section P is, as shown in FIG. 3, shaped in the form of a ring 8. The abutting ends 9 of the composite section P are welded together.

The central disc 4, which in the assembled condition is screwed to a hub (not shown here), is pushed into the steel ring $6_m$ made from the steel strip 6 embedded in the light metal body 5, and its edge $4_m$ welded to the steel ring $6_m$ at position 10. Preferably, the steel insert 6 forms a steel ring $6_m$ surrounded by the body section 5 so that the steel ring $6_m$ encloses the wheel disc or dish 4. It can be seen that edge $4_m$ lies against the steel insert or steel ring $6_m$ and is approximately parallel to the axis of rotation D of the wheel.

Figure 4:
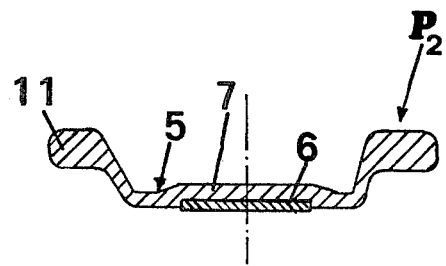
FIG. 4 is a reduced cross section of another composite section.

FIG. 4 shows an extruded composite section, the light metal body 5 of which is already provided with raised rim parts 11 for the shoulder-like parts of the rim bed 3 to act as a seating 12 (FIG. 1) for the tire.

Thus, it can be seen that in accordance with the present invention, the insert 6 is preferably at least partly embedded in the section constituting the body 5, usefully in the surface of the composite section facing the central disc or dish of the wheel.

The insert is, according to one preferred embodiment of the present invention, made of steel and forms a ring around the body of the wheel on the inner face of the rim. This steel ring strengthens the highly stressed central region of the rim and at the same time can be employed to affix the rim to the central disc or dish 4 of the wheel. The latter is made in a separate manufacturing step, preferably out of a material of superior strength steel, for example, and joined to the rim after it has been made out of the composite section.

The connection of the steel ring 6 of the rim 3 to the wheel disc or dish 4 by means of spot welding or other kind of welding leads to an extremely strong wheel for air or gas filled tires and for use on motor vehicles. In view of the above-described measures, the shortcomings of known light metal wheel rims, usually forged or single castings, are avoided. In the case of the cast or forged versions both parts cannot be welded because of the softening which results.

Also within the scope of the present invention is a wheel with a steel ring which is discontinuous in at least one place, for example, the two ends or the plurality of arc-shaped pieces which make up the ring can be spaced apart In the case of the wheel of the present invention, the central steel disc is welded without problem to the steel insert or inserts forming the steel ring and it is in fact joined at the region where the greatest local stress arises due to the weight of the vehicle. Outside of this high load region the wheel may be solely of lightweight metal.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A wheel for air or gas filled tires to be used on motor vehicles and having a ring-shaped rim around a central wheel disc, wherein at least the rim is made out of a composite section having a light metal body section and a central insert of higher strength metal which forms part of the surface of the body section, is at least partly embedded in the surface of the composite section facing the wheel disc, and which strengthens the highly stressed central region of the rim, wherein the insert forms a ring surrounded by the body section with said insert ring of the rim enclosing the wheel disc.

2. A wheel according to claim 1 wherein the body section and the insert of the composite section are metallurgically joined.

3. A wheel according to claim 1 wherein the rim is made out of an extruded composite section.

4. A wheel according to claim 1 wherein the body section is made of an alloy selected from the group consisting of aluminum and magnesium.

5. A wheel according to claim 1 wherein the insert is made of steel.

6. A wheel according to claim 1 wherein the wheel disc is made of steel.

7. A wheel according to claim 6 wherein the insert is made of steel and wherein the steel insert and the wheel disc are welded together.

8. A wheel according to claim 7 wherein the wheel disc has an edge part which lies against the steel insert, wherein the edge part is approximately parallel to the axis of rotation of the wheel.

9. A wheel according to claim 1 wherein the rim is strengthened in the region of the insert by a projection in the body section.

* * * * *